United States Patent
Kovtunenko et al.

(10) Patent No.: US 10,904,098 B2
(45) Date of Patent: Jan. 26, 2021

(54) HEALTH CHECK AUTOMATION FOR VIRTUAL NETWORK FUNCTIONS

(71) Applicant: T-Mobile USA, Inc., Bellevue, WA (US)

(72) Inventors: Artem Kovtunenko, Kirkland, WA (US); Jordan Rider, Seattle, WA (US); Bikash Agarwal, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 55 days.

(21) Appl. No.: 16/457,333

(22) Filed: Jun. 28, 2019

(65) Prior Publication Data
US 2020/0412621 A1 Dec. 31, 2020

(51) Int. Cl.
*H04L 12/24* (2006.01)
(52) U.S. Cl.
CPC ............. *H04L 41/14* (2013.01); *H04L 41/22* (2013.01)
(58) Field of Classification Search
CPC ......... H04L 41/14; H04L 43/50; H04L 41/22; H04L 43/04; H04L 43/062; H04L 41/0853; H04L 41/0866; H04L 41/5038; H04L 43/00
See application file for complete search history.

(56) References Cited

U.S. PATENT DOCUMENTS

| | | | |
|---|---|---|---|
| 5,886,693 A | 3/1999 | Ho et al. |
| 6,654,606 B1 | 11/2003 | Foti et al. |
| 7,003,564 B2 | 2/2006 | Greuel et al. |
| 7,209,963 B2 | 4/2007 | Burton et al. |
| 7,313,735 B1 | 12/2007 | Levergood et al. |
| 7,577,101 B1 | 8/2009 | Choiniere et al. |
| 7,742,421 B2 | 6/2010 | Bantukul et al. |
| 7,792,922 B2 | 9/2010 | Purcell et al. |
| 7,814,535 B1 | 10/2010 | Barile et al. |
| 7,849,186 B2 | 12/2010 | Satt et al. |
| 7,991,919 B2 | 8/2011 | Satt et al. |
| 8,073,710 B2 | 12/2011 | Hasan et al. |
| 8,108,733 B2 | 1/2012 | Richmond |
| 8,190,737 B2 | 5/2012 | Satt et al. |
| 8,195,795 B2 | 6/2012 | Satt et al. |
| 8,275,578 B2 | 9/2012 | Klein et al. |
| 8,847,767 B2 | 9/2014 | Lim et al. |
| 9,047,648 B1 | 6/2015 | Lekutai et al. |

(Continued)

*Primary Examiner* — Sargon N Nano
(74) *Attorney, Agent, or Firm* — Perkins Coie LLP

(57) ABSTRACT

The disclosed embodiments include a method for performing a health check of a telephony application server (TAS) or call session control function (CSCF) with an integrated virtual network function (iVNF) architecture. The method can include receiving a predefined command at a client component on a central node of the TAS or the CSCF. The command causes the client component to execute a procedure to obtain health data of component node(s) other than the central node. The method can further include fetching the health data obtained by agent component(s) of the component node(s). Each component node has an agent component, and the health data is fetched in accordance with the predefined command received by the client component. The method can further include causing display of an output based on the fetched health data, wherein the output is indicative of a health status of the TAS or the CSCF.

20 Claims, 7 Drawing Sheets

(56) References Cited

U.S. PATENT DOCUMENTS

| | | | |
|---|---|---|---|
| 9,130,954 | B2 | 9/2015 | Joshi et al. |
| 9,164,864 | B1 | 10/2015 | Novick et al. |
| 9,274,905 | B1 | 3/2016 | Dinkel et al. |
| 9,413,618 | B2 | 8/2016 | Martinez Perea et al. |
| 9,443,084 | B2 | 9/2016 | Nice et al. |
| 9,886,338 | B1 | 2/2018 | Khokhar et al. |
| 9,906,422 | B2 | 2/2018 | Jalan et al. |
| 9,992,086 | B1 | 6/2018 | Mizik et al. |
| 10,051,681 | B2 | 8/2018 | Lau et al. |
| 10,117,090 | B2 | 10/2018 | Jahangir et al. |
| 10,264,619 | B2 | 4/2019 | Lau et al. |
| 10,581,717 | B2 * | 3/2020 | Tejaprakash ............ H04L 43/04 |
| 10,700,946 | B2 * | 6/2020 | Kojukhov ............ H04L 41/5032 |
| 2018/0176115 | A1 * | 6/2018 | Yang ........................ H04L 41/00 |
| 2018/0322034 | A1 | 11/2018 | Kou et al. |
| 2018/0337931 | A1 * | 11/2018 | Hermoni ................ G06F 16/955 |
| 2019/0104047 | A1 * | 4/2019 | Tejaprakash ............ H04L 41/22 |
| 2020/0028772 | A1 * | 1/2020 | Laslau .................. H04L 41/145 |
| 2020/0162323 | A1 * | 5/2020 | Abu Lebdeh ....... H04L 41/0806 |
| 2020/0177486 | A1 * | 6/2020 | Bisht ................... H04L 43/0817 |

* cited by examiner

HEALTH CHECK AUTOMATION FOR VIRTUAL NETWORK FUNCTIONS

BACKGROUND

Product development within the telecommunication industry follows rigorous standards for stability, protocol adherence and quality, which results in reliable systems. While this model worked well in the past, it inevitably led to long product cycles, a slow pace of development, and reliance on proprietary or custom hardware. The rise of significant competition in communication services from fast-moving organizations operating at large scale on the Internet has spurred service providers to improve product development models.

A network function virtualization (NFV) framework is a network architecture that virtualizes entire classes of network node functions into building blocks that may connect, or chain together, to create communication services. A virtual network function (VNF) is a software implementation of a network function that can include one or more virtual machines running different software and processes, on top of standard high-volume servers, switches and storage devices, or even cloud computing infrastructure, instead of having custom hardware for each network function. The network function virtualization infrastructure (NFVI) is the totality of all hardware and software components that build the environment where VNFs are deployed. The NFVI can span several interconnected locations.

An NFV management and orchestration architectural framework (NFV-MANO) is the collection of all functional blocks, data repositories used by the blocks, and reference points and interfaces through which these functional blocks exchange information for the purpose of managing and orchestrating NFVI and VNFs. The building blocks for both the NFVI and the NFV-MANO is the NFV platform. The NFVI portion of the platform includes virtual and physical processing and storage resources, and virtualization software. The NFV-MANO portion of the platform includes VNF and NFVI managers and virtualization software operating on a hardware controller. The NFV platform has limited carrier-grade features to manage and monitor platform components, to recover from failures, and to provide security.

BRIEF DESCRIPTION OF THE DRAWINGS

Embodiments of the present technology will be described and explained through the use of the accompanying drawings.

Figure 1:
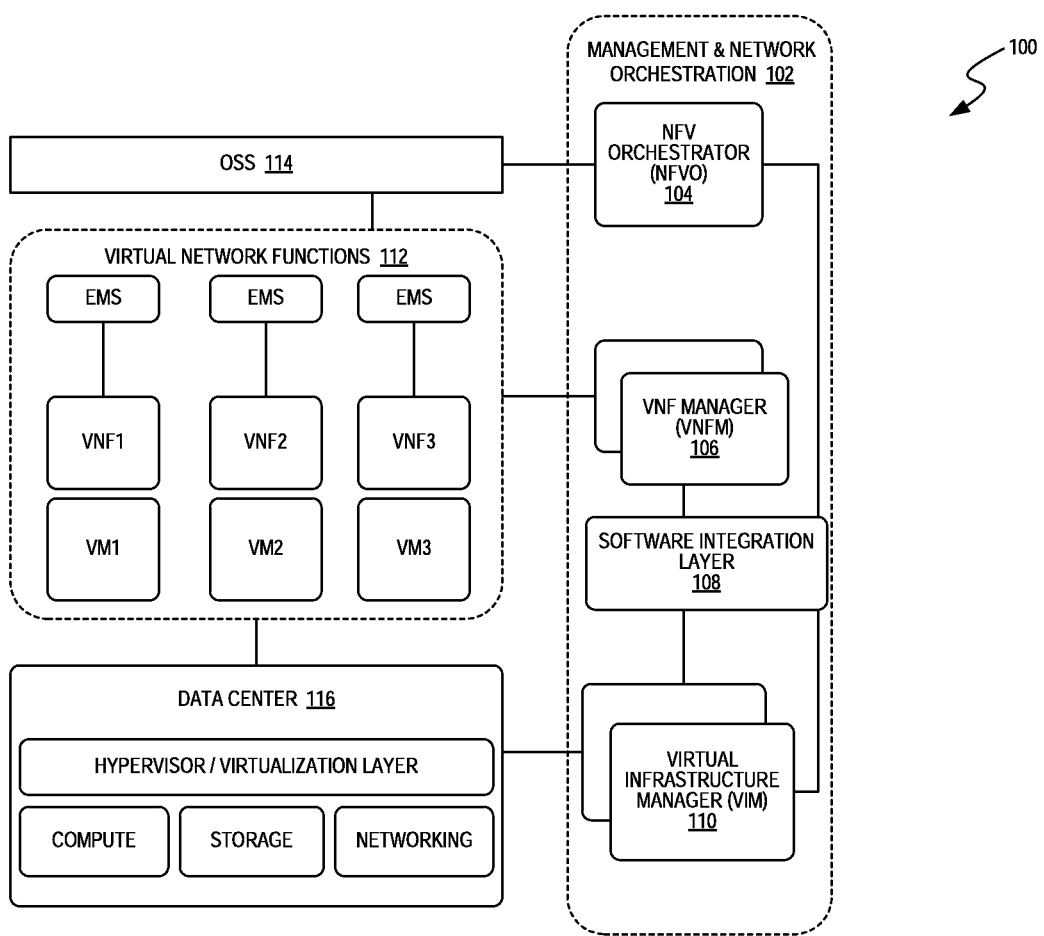
FIG. 1 is a block diagram that illustrates a network function virtualization (NFV) and management and orchestration (NFV-MANO) platform.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

This disclosure relates to checking a health status of a telecommunications node that has an integrated virtual network function (iVNF) architecture. The iVNF architecture provides scaling of resources as needed for subscriber growth, redundancy, and unforeseen problems. The IP multimedia subsystem (IMS) core of a telecommunications network includes nodes that can be migrated to an iVNF architecture, examples of which include a telephony application server (TAS) and call session control function (CSCF), or similar application that can include virtual network functions (VNFs).

To build highly reliable and scalable services, network function virtualization (NFV) requires that the network be able to instantiate VNF instances, monitor them, repair them, and bill for services rendered. These carrier-grade features are allocated to an orchestration layer in order to provide high availability and security, and low operation and maintenance costs. The orchestration layer must be able to manage VNFs irrespective of underlying technology. For example, an orchestration layer must be able to manage a session border controller (SBC) VNF from vendor X running on VMWARE VSPHERE just as well as an IMS VNF from vendor Y running on a kernel-based virtual machine (KVM).

There is currently a significant gap in operational tools for an iVNF platform because each VNF or physical network function (PNF) has its own unique challenges for operations. For example, each VNF is instantiated with an IP address assigned by, e.g., Openstack, which can change from node to node, each VNF has a Red Hat (RH) Linux Command Line Interface (CLI), a ConfD CLI, a REST interface, and, in the case of a signaling network router (SNR), a man-machine language (MML) interface, and each TAS or CSCF has several nodes. Currently there is no way to effectively manage an iVNF platform because an administrator has to log into each of these nodes, one at a time, to check status or configuration information.

The disclosed solution can flexibly perform a health check of an iVNF and automate output processing to present test results in a human-readable format that facilitates troubleshooting. The disclosed solution includes a client component on a central node of the iVNF, and agent components on other nodes of the iVNF that communicate with the same client component. The test outputs of agent components are collected by the client component. The collected test outputs are processed to present test results on a computer.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a local area network (LAN), wide area network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

The iVNF architecture is developed based on the European Telecommunications Standards Institute (ETSI) management and orchestration (MANO) architecture. FIG. 1 is a block diagram that illustrates an NFV-MANO platform 100 in which aspects of the invention can operate. The NFV-MANO platform 100 is built with a cloud native and web-scale architecture. The NFV-MANO platform 100 allows operators to control VNF assets while including NFV infrastructure features for traffic aggregation, load balancing and end-to-end service assurance with analytics, monitoring, and orchestration.

A MANO portion 102 includes an NFV orchestrator (NFVO) 104 coupled to a VNF manager (VNFM) 106, a software integration layer 108, and a virtualized infrastructure manager (VIM) 110. The NFVO 104 coordinates the resources and networks needed to set up cloud-based services and applications. This process uses a variety of virtualization software and industry-standard hardware. The NFV defines standards for compute, storage, and networking resources that can be used to build the VNFs 112. As illustrated, each VNF has an element management system (EMS) on top of an VNF that resides on a virtual machine (VM). An EMS is responsible for the FCAPS (fault, configuration, accounting, performance and security management) for the functional part of the VNF. The NFV-MANO platform 100 also includes an OSS 114 that includes a collection of systems/applications that a service provider uses to operate. The data center 116 includes a hypervisor/virtualization layer on top of a hardware networking infrastructure of compute, storage, and networking components.

The VNFM 106 works in concert with the other NFV-MANO functional blocks, the VIM 110 and the NFVO 104, to help standardize the functions of virtual networking and increase the interoperability of software-defined networking elements. These components, as standardized by ETSI, provide a standard framework for building NFV applications.

Figure 2:
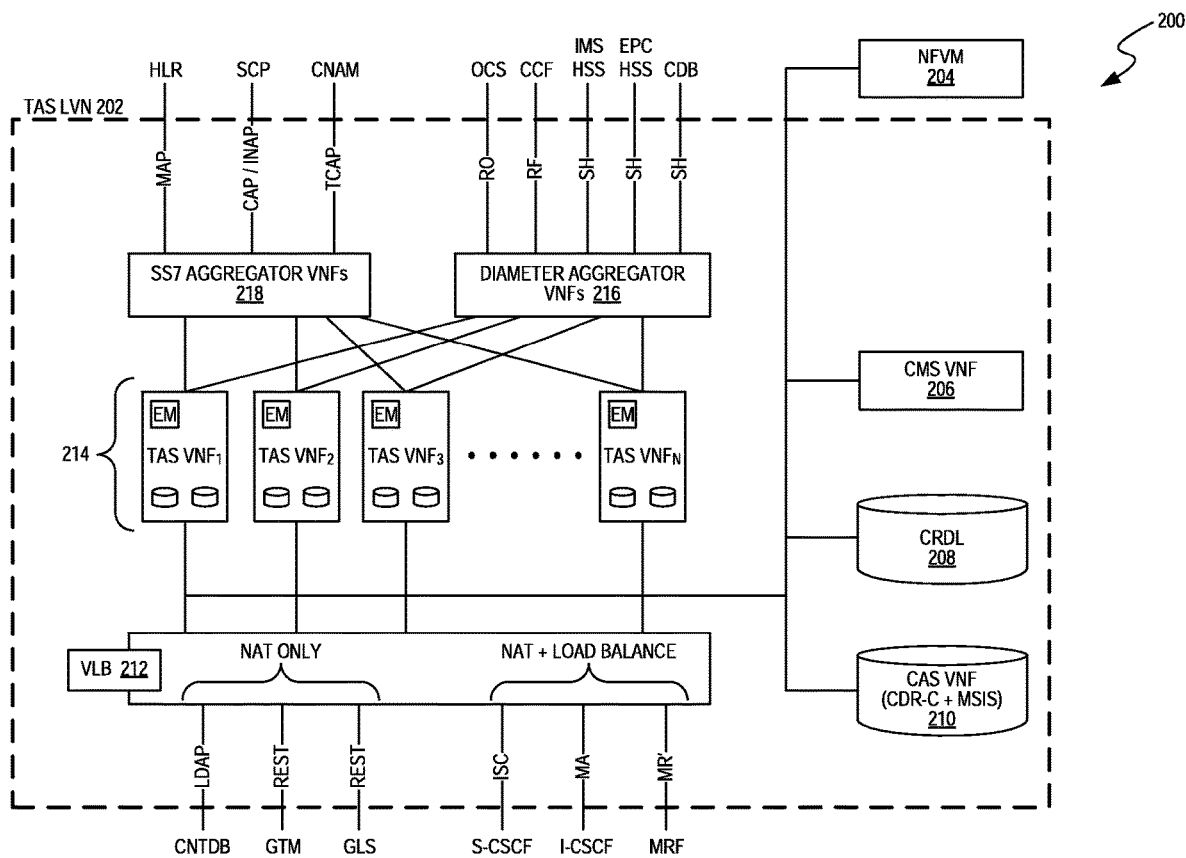
FIG. 2 is a block diagram that illustrates an example of a telephony application server (TAS) with an integrated virtual network function (iVNF) architecture.

FIG. 2 is a block diagram that illustrates an example of an architecture for a TAS iVNF 200. The TAS iVNF 200 includes a network function virtualization manager (NFVM) 204 coupled to a TAS locally virtual network (LVN) 202. The TAS LVN 202 can carry out functions of a typical TAS node of a telecommunications network. Examples include functions that are not directly related to routing of messages through the network such as in-network answering machines, automatic call forwarding, and conference bridges.

The TAS LVN 202 includes a combination of nodes (also referred to herein as elements) including a central management system (CMS) 206. The CMS 206 is a central node/element that can function as a gateway to nodes/elements of the TAS LVN 202 including VNF components such as a virtual load balancer (VLB) 212, TAS VNFs 214, Diameter aggregator (DA) 216 VNFs, and SS7 aggregator VNFs 218. The TAS LVN 202 also has a cloud range data layer (CDRL) 208, a central analytics server (CAS) 210 and. As such, the CMS 206 can function as a proxy for a console (e.g., remote console) to perform test operation(s) on nodes of the TAS LVN 202.

The disclosed embodiments include a remote commander tool that can administer test operations to obtain status and configuration information ("health data") of the nodes/elements of the TAS LVN 202. The remote commander has two parts: a client application ("rc-client") and one or more agent applications ("rc-agents") that reside on respective nodes/elements of the TAS LVN 202 except for the CMS 206. The CMS 206 runs the rc-client to communicatively couple with respective rc-agents on the other nodes/elements of the TAS LVN 202. In some embodiments, only nodes/elements that have an rc-agent can respond to the rc-client's requests.

In some embodiments, the rc-client is a web-based application that can collect health data regularly (e.g., constantly, periodically) or irregularly (e.g., on demand) by communicating with the rc-agents. The rc-agents can collect health data of tests performed at respective nodes and forward the health data to the CMS 206. The CMS 206 can store the health data of the agent nodes locally at the CMS 206 or save the health data at another database.

Figure 3:
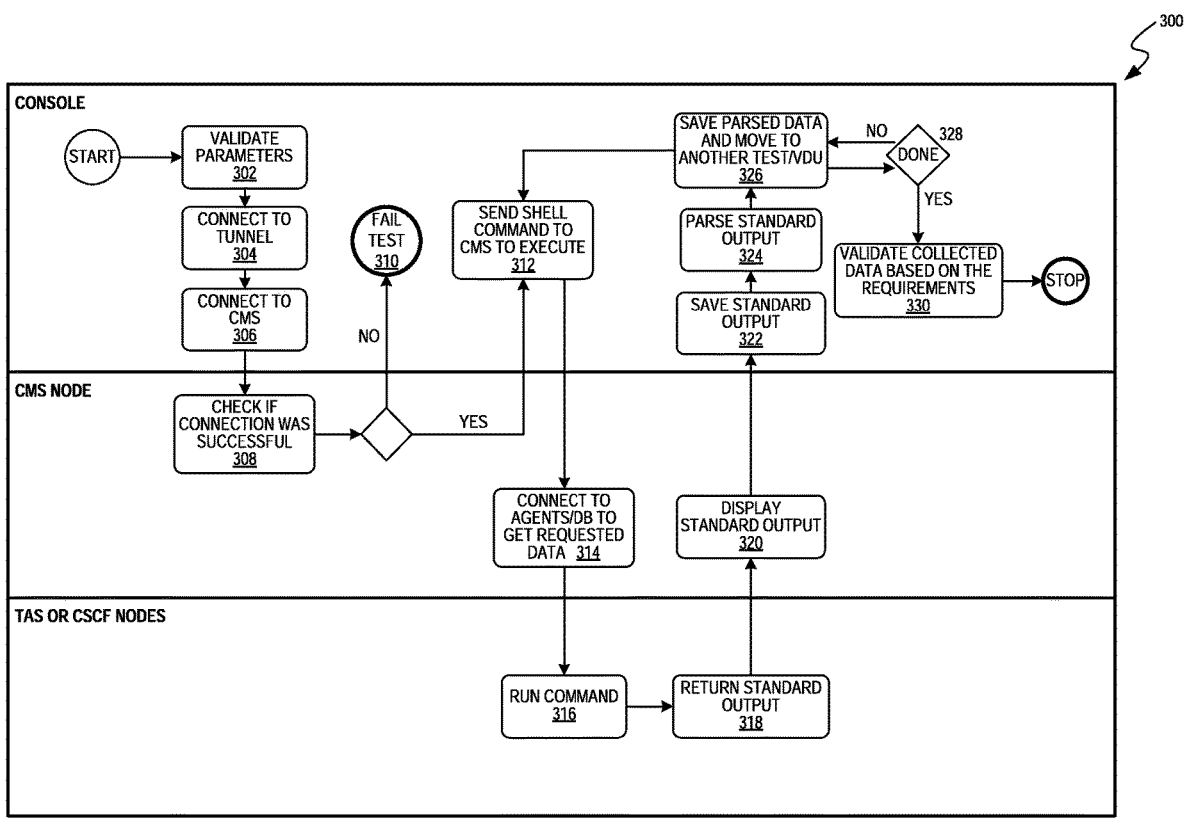
FIG. 3 is a flow diagram that illustrates a process for executing a test script to perform a health check for an iVNF.

FIG. 3 is a flow diagram that illustrates a process for executing a test script to perform a health check for an iVNF. The remote commander orchestrates operations of the rc-client and rc-agents across nodes of an LVN which, in this example, is a TAS node or a CSCF node. The rc-client resides on the CMS node to control operations, and one or more rc-agents reside on respective nodes (except for the CMS node) of the TAS/CSCF node.

In 302, one or more validation parameters are defined to validate outputs of a test script execution. For example, the validation parameters can include requirements that define whether health data indicates that a node of an LVN passed/failed a test.

In some embodiments, the rc-client can administer a user interface rendered on a console (e.g., a remote console) to allow a user to select options for a health check. Examples include a "find" option to search and list available predefined commands; an "exact" option to retrieve a specific option by typing the corresponding name in manually; a "command" option that will run a predefined command over a group or series of nodes; and an "m-command" option that will run multiple commands in a predefined sequence over a group series of nodes. In some embodiments, a user can specify an argument for a command to include a node name (e.g., LVN in an iVNF), a node/element name (e.g., TAS VDU, VLB, SNR) and the command that the user wishes to run.

In 304, an automation script/application connects the console to a tunnel for establishing a communications channel with the CMS node. In 306, the console connects to the CMS node over the communications channel through a secure shell (SSH) tunnel. As such, the console can securely interface with the CMS node to send commands, cause the CMS to execute commands, and obtain outputs based on executed commands.

In 308, the CMS node determines whether a successful connection to the console exists. For example, the CMS node can check whether a received command is supported for the TAS/CSCF node. The remote commander can work with commands that are used daily such as readShm, listing files in a directory, checking status, MML commands (for SNR) and more. In some embodiments, the iVNF only works with individual, predefined commands that have no user input requirements. As such, the remote commander would not run a command that requires user input (e.g., a command with a Yes/No confirmation). In some embodiments, the remote commander will not work with long-running commands, for example, using a tail-f command to monitor changes in a single file.

In 310, the test failed because the connection was unsuccessful. For example, the test can fail when the CMS node determines that a received command is not supported to run the test. As a result, the CMS can generate an error message that is communicated to the console. The error message indicates that the test failed to run.

In some embodiments, the remote commander can include one or more error checking mechanisms. An error checking mechanism can prevent accidentally running a command on an incompatible node. For example, the system may not allow a TAS-specific command to run on a CSCF node and vice versa. Hence, trying to run a CSCF-specific command on a TAS node would not generate any test output. The console can also receive an error message when attempting to run a command (single or multiple) that does not exist for a specific type of node. In some embodiments, the console can output an error message as a visualization for display on a display screen of the console. Moreover, a parser program may have a list of predefined error messages such that, when health data is parsed, and a predefined error message is identified, the identified error message can be recorded and displayed to the user on the display screen.

In 312, the CMS node executes a command sent by the console. The console sends the command over the communication channel. For example, a user of the console can select a predefined command, from a list of predefined commands, to run a specified test. In some embodiments, commands are defined in a single file SQLITE3 database file which allows for easy updating and adding of new commands. The files can then compiled to LINUX and require minimal setup to get the program running.

In 314, the CMS node runs a supported command by connecting an rc-client to rc-agents to collect health data in accordance with a selected test script. The rc-client resides on the CMS node and is registered to a file path such that the rc-client can run from any directory while saving all files in the same home directory. The process is administered by the rc-client communicatively coupled to one or more rc-agents of the remote commander, which is designed as such for ease of use, speed, and security. The CMS node can use HTTPS to establish the communications links between the rc-client and the rc-agent(s).

In 316, the TAS/CSCF node runs the supported command to fetch health data collected by the rc-agents in accordance with a selected test script. That is, the rc-client requests the rc-agents to run a health check test and return health data. The health data is "standard" data such as raw health data or minimally-processed health data. The standard health data is typically not formatted in a human-readable manner.

In 318, the TAS/CSCF node returns standard output including the health data. The health data can be collected in a variety of ways. For example, the fetched data can be obtained by the CMS node from a local database that collects health data from the rc-agents. In some embodiments, the CMS node can query a local database for health data that was collected by all rc-agents. In some embodiments, the health data is collected by employing a data scraping technique where a computer application extracts data from a human-readable output of another application. In 320, the CMS node can cause a display of the standard test outputs obtained by the rc-client from the rc-agents.

Figure 4:
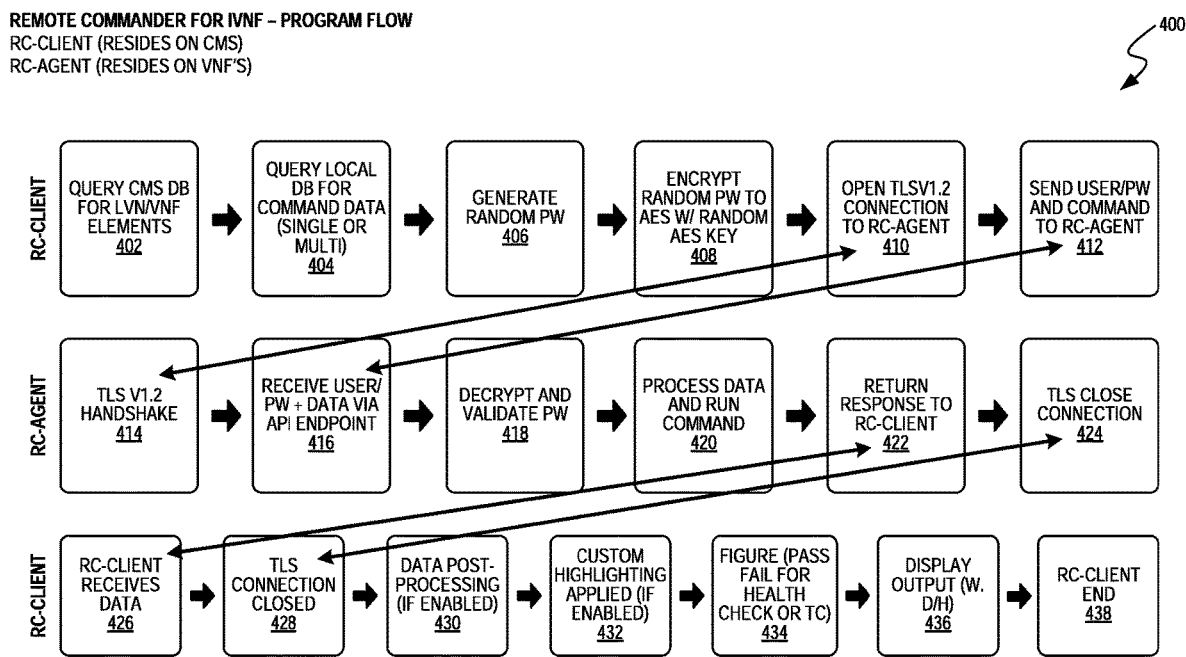
FIG. 4 is a block diagram that illustrates a process flow between client and agent components of an iVNF to execute a test script.

FIG. 4 is a block diagram that illustrates a process flow 400 between an rc-client and an rc-agent to establish a communications link and run a command in accordance with a test script. As shown, the remote commander can perform various functions. In one example, a remote commander can process a test script to check an application log for stored data of a core dump of an element. Other examples include execution of a user-typed command over a group or series of nodes, running a single predefined command sequence over a group or series of nodes, and running multiple predefined commands over a group or series of nodes.

In 402, the rc-client queries a database of the CMS node for names of nodes/elements of the LVN (e.g., TAS/CSCF node). The rc-client does not necessarily need the IP addresses to run tests on respective nodes/elements. In 404, the rc-client queries a local database for commands (e.g., single or multiple commands) to run on the nodes/elements. In 406, the rc-client generates a pseudo/random password to securely connect the rc-client to the rc-agent. The pseudo/random password may be known only to the rc-client and rc-agents. In 408, the rc-client encrypts the password with, for example, advanced encryption standard (AES) encryption. In 410, the rc-client opens a connection with an rc-agent. In 412, the rc-client sends information including the secured password and a command to the rc-agent.

In 414, the rc-agent performs a handshake operation to establish the connection with the rc-client. In 416, the rc-agent receives the secured password and command of the rc-client. In 418, the rc-agent decrypts and validates the secured password. In some embodiments, the decryption key is also a pseudo/random key. In 420, the rc-agent will process the received data and run the command. In 422, the rc-agent returns a response (e.g., health data) to the rc-client. Then, in 424, the rc-agent closes the connection with the rc-client.

In 426, the rc-client receives the response data from the rc-agent. Then, in 428, the rc-client closes the connection with the rc-agent. In 430, the rc-client can process the response data. In 432, the rc-client can cause custom highlighting of the response data. In 434, the rc-client can perform a pass/fail health check (or other function) based on the response data. In 436, the rc-client causes display of an output based on the health data. In 438, the rc-client operation ends because the health data has been obtained and is passed to an automated health data processing mechanism.

For example, referring back to FIG. 3, in 322, the standard output obtained by the CMS is saved by the console. In 324, the standard output is passed to a parser program that is operable to parse and format health data of each rc-agent. The outcome of the parser is formatted health data with improved human-readability that constitutes test results. For example, the remote commander can reformat text output from XML to JSON for better readability, apply custom colors and formatting rules, and generate pass/fail results of commands used in test cases. The parsing operations can facilitate subsequent querying of test results for specific health data. For example, the parser can structure and/or index standard output to facilitate interpreting the test results or to facilitate access to specific portions or types of the test results. In 326, the formatted health data is stored, and health checks can continue for remaining test scripts on remaining nodes/elements.

Figure 5:
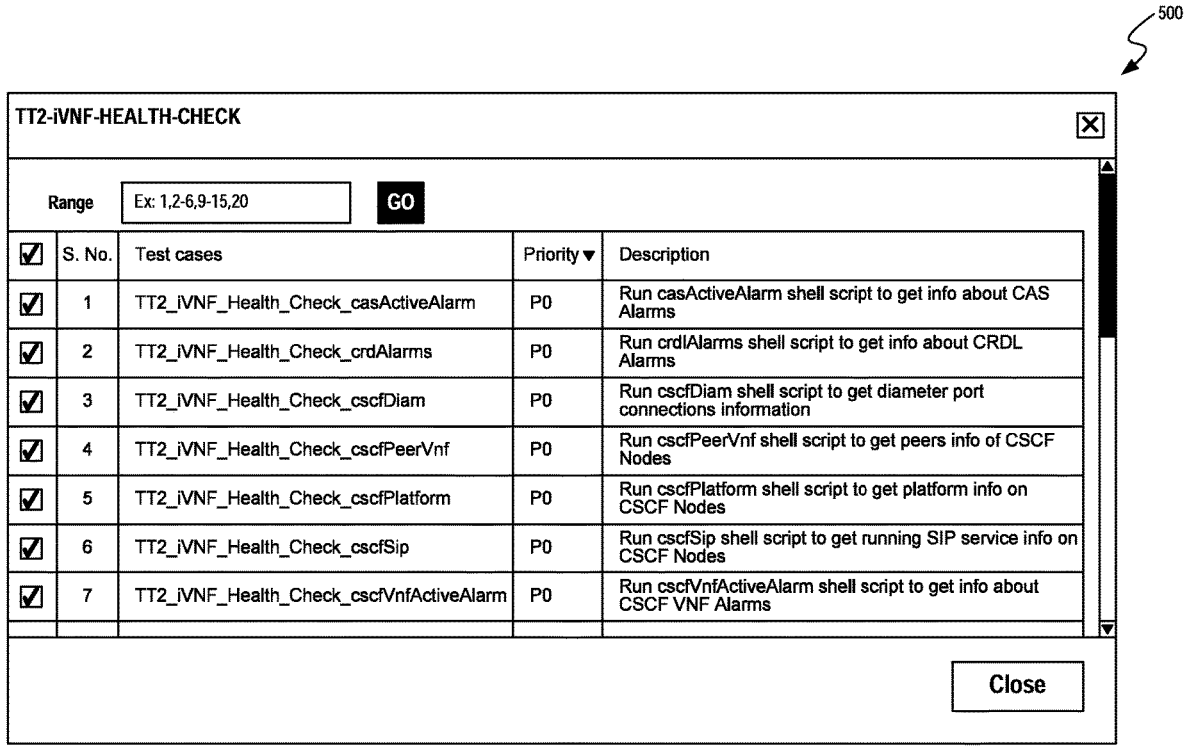
FIG. 5 depicts an interface including a list of test scripts, priority information, and descriptions for each test.

In 328, the remote commander determines that all the test scripts have been executed and passes the test results to a validator program. That is, once all the test scripts have been executed, validation of the test results can be completed. For example, FIG. 5 depicts an interface 500 including a list of test scripts, priority information, and descriptions for each test case.

Figure 6:
FIG. 6 depicts an interface that displays formatted test results as pass/fail status and related information.

In 330, the validator validates the test results based on the parameter requirements specified in 302. As such, the test results show whether nodes/elements of an LVN passed/failed selected tests. In some embodiments, the validator can filter health data for nodes represented in a map with a key corresponding to each node's name or IP address and a parameter value for a list of core files/logs to check whether the nodes have the desired core files. For example, the validator can have a filter that specifies a criterion that limits collection of core files only if created within a time frame specified in 302, and then only those core files are displayed. The validated health data can be saved and reported for display in a formatted HTML file. This validated health data can be displayed on the display screen of the console (e.g., local box). Therefore, the test results can include an interpretation about whether a node of the TAS/CSCF node passed/failed a test script. FIG. 6 depicts an interface 600 including the data outputs formatted as pass/fail status information and related information.

Figure 7:
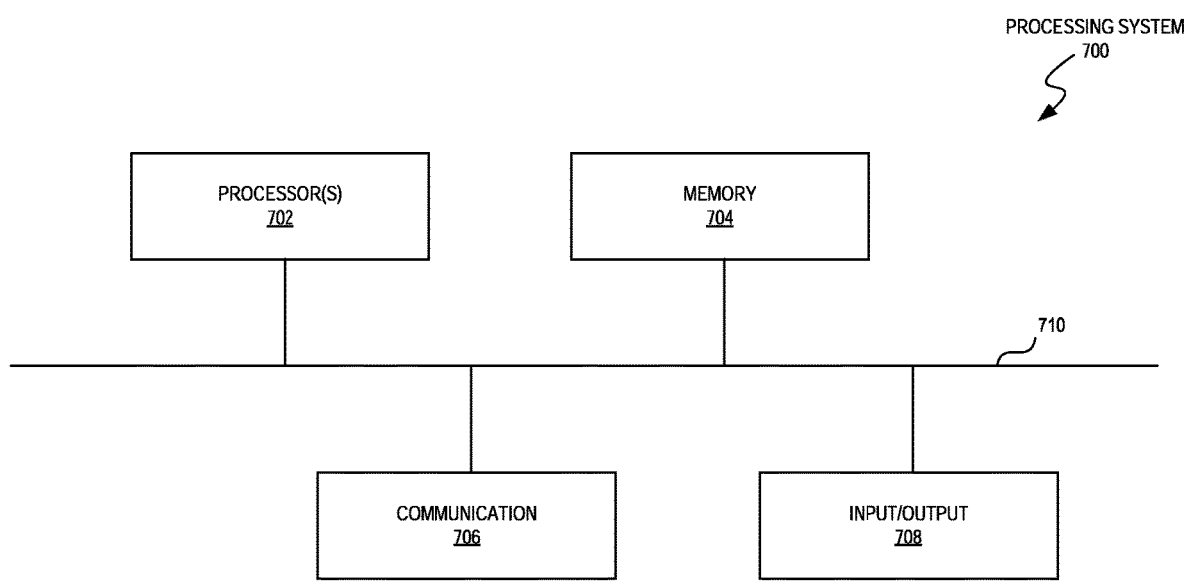
FIG. 7 is a block diagram that illustrates an example processing system in which aspects of the disclosed technology can be embodied.

FIG. 7 is a block diagram illustrating an example of a processing system 700 in which at least some operations described herein can be implemented. The processing system 700 represents a system that can run any of the methods/algorithms described herein. The processing system 700 can include one or more processing devices, which can be coupled to each other via a network or multiple networks. A network can be referred to as a communication network or telecommunications network.

In the illustrated embodiment, the processing system 700 includes one or more processors 702, memory 704, a communication device 706, and one or more input/output (I/O) devices 708, all coupled to each other through an interconnect 710. The interconnect 710 can be or include one or more conductive traces, buses, point-to-point connections, controllers, adapters and/or other conventional connection devices. Each of the processor(s) 702 can be or include, for example, one or more general-purpose programmable microprocessors or microprocessor cores, microcontrollers, application specific integrated circuits (ASICs), programmable gate arrays, or the like, or a combination of such devices.

The processor(s) 702 control the overall operation of the processing system 700. Memory 704 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 704 can store data and instructions that configure the processor(s) 702 to execute operations in accordance with the techniques described above. The communication device 706 can be or include, for example, an Ethernet adapter, cable modem, Wi-Fi adapter, cellular transceiver, Bluetooth transceiver, or the like, or a combination thereof. Depending on the specific nature and purpose of the processing system 700, the I/O devices 708 can include devices such as a display (which can be a touch screen display), audio speaker, keyboard, mouse or another pointing device, microphone, camera, etc.

While processes or blocks are presented in a given order, alternative embodiments can perform routines having steps or employ systems having blocks, in a different order, and some processes or blocks may be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 700 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be a volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems, and devices described above can include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to the desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements.

In some embodiments, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. A method for performing a health check of an IP multimedia subsystem (IMS) core node with an integrated virtual network function (iVNF) architecture, the method comprising:
   receiving a predefined command at a client component that resides at a central management system (CMS) node of the IMS core node,
      wherein the IMS core node includes a telephony application server (TAS) node or a call session control function (CSCF) node,
      wherein the predefined command causes the client component to execute a procedure to obtain health data of one or more component nodes other than the CMS node of the IMS core node, and
      wherein each of the one or more component nodes includes a virtual network function (VNF);
   fetching the health data obtained by one or more agent components of the one or more component nodes,
      wherein each component node except for the CMS node has an agent component, and
      wherein the health data is fetched in accordance with the predefined command received by the client component;
   automatically parsing and formatting the health data;
   validating the parsed and formatted health data in accordance with a pre-specified parameter requirement to produce an indication of a health status of the IMS core node; and
   causing display of the indication of the health status of the IMS core node.

2. The method of claim 1 further comprising, prior to causing display of the indication of the health status of the IMS core node:
   automating processing of the health data by:
      parsing the health data in accordance with the predefined command to extract data indicative of a health state of the one or more component nodes; and
      processing the extracted data in accordance with a rule or criterion to produce the indication of the health status of the IMS core node.

3. The method of claim 1, wherein fetching the health data comprises:
   responsive to receiving the predefined command, obtaining the health data from a database of the CMS node.

4. The method of claim 1, wherein fetching the health data comprises:
   responsive to receiving the predefined command, causing the one or more agent components to collect the health data and forward the collected health data to the control component at the CMS node.

5. The method of claim 1, wherein the IMS core node includes the TAS node.

6. The method of claim 1 further comprising, prior to receiving the predefined command:
   administering a user interface rendered on a display device to allow a user to select the predefined command from among a plurality of predefined commands.

7. The method of claim 1 further comprising, prior to fetching the health data obtained by the one or more agent components:
   determining that the predefined command is supported for application on the IMS core node.

8. The method of claim 1, wherein the predefined command is a first predefined command and the IMS core node is a first IMS core node, the method further comprising:
   receiving a second predefined command at the client component of the first IMS core node, wherein the second predefined command is selected at a console;
   determining that the second predefined command is supported for application on a second IMS core node different from the first IMS core node; and
   communicating an error message to the console, the error message indicating a failure to perform the health check of the first IMS core node.

9. The method of claim 1, wherein the predefined command is a first predefined command and the IMS core node is a first IMS core node, the method further comprising:
   receiving a second predefined command at the client component of the first IMS core node, wherein the second predefined command is selected at a console;
   determining that the second predefined command is not supported for application on the first IMS core node; and
   communicating an error message to the console, the error message indicating a failure to perform the health check of the first IMS core node.

10. The method of claim 1, wherein fetching the health data obtained by the one or more agent components of the one or more component nodes comprises:
   retrieving the health data from a database of the CMS node, wherein the database regularly collects health-related data from the one or more agent components, and the health data is stored at the database prior to receiving the predefined command.

11. The method of claim 1, wherein fetching the health data obtained by the one or more agent components of the one or more component nodes comprises:
   collecting the health data from the one or more agent components in response to receiving the predefined command.

12. The method of claim 1, wherein the procedure to obtain the health data of one or more component comprises:
   executing a script that connects a console to a secure shell (SSH) tunnel;

causing connection of the console to the CMS node through the SSH tunnel; and
causing a user interface to display on the console, wherein the predefined command is selected from among a plurality of predefined commands displayed on the user interface.

13. The method of claim 1, wherein the procedure to obtain the health data of one or more components comprises:
generating a password to securely connect the client component to the one or more agent components of the IMS core node;
encrypting the password in accordance with an encryption standard such that the one or more agent components are capable of decrypting the password; and
opening one or more connections between the one or more agent components of the IMS core node and the client component.

14. The method of claim 1, wherein the IMS core node includes the CSCF node.

15. At least one non-transitory computer-readable storage medium carrying instructions that, when executed by at least one processor, perform operations to cause a central component node of an IP multimedia subsystem (IMS) core node with an integrated virtual network function (iVNF) architecture to perform a health check, the operations comprising:
initiating a connection between a console and a central management system (CMS) component node of the IMS core node,
wherein the IMS core node includes a telephony application server (TAS) node or a call session control function (CSCF) node;
causing a user interface to display on the console, wherein a predefined command is selected from among multiple predefined commands displayed on the user interface;
executing a procedure by a client component of the CMS component node to obtain health data from at least one agent component of one or more component nodes other than the CMS component node,
wherein each of the one or more component nodes other than the CMS component node includes a virtual network function (VNF);
outputting the health data obtained by one or more agent components of the one or more component nodes,
wherein the health data is fetched in accordance with the predefined command;
automatically parsing and formatting the health data;
validating the parsed and formatted health data in accordance with a pre-specified parameter requirement to produce an indication of a health status of the IMS core node; and
causing display of the indication of the health status of the IMS core node.

16. The non-transitory computer-readable storage medium of claim 15, wherein the predefined command is a user-typed command for application on a group of the one or more component nodes of the IMS core node.

17. The non-transitory computer-readable storage medium of claim 15, wherein the predefined command is a single command for application on a group of the one or more component nodes of the IMS core node.

18. The non-transitory computer-readable storage medium of claim 15, wherein the predefined command includes multiple commands for application on a group of the one or more component nodes of the IMS core node.

19. A system for checking a health status of an IP multimedia subsystem (IMS) core node including a telephony application server (TAS) node or a call session control function (CSCF) with an integrated virtual network function (iVNF) architecture, the system including:
one or more memories of a telecommunications network that store instructions for collecting health data from multiple agent components and that store a database of health data collected from the multiple agent components; and
one or more processors of the telecommunications network, coupled to the one or more memories, and configured to check a health status of a virtual network function (VNF) of one or more component nodes of the IMS core node, where execution of the instructions causes the system to:
receive a predefined command at a client component that resides at a central management system (CMS) node of the IMS core node;
execute a procedure to obtain health data of one or more component nodes other than the CMS node of the IMS core node;
output the health data obtained by one or more agent components of the one or more component nodes,
wherein the health data is fetched in accordance with the predefined command received by the client component;
automatically parse and format the health data;
validate the parsed and formatted health data in accordance with a pre-selected parameter to produce an indication of the health status of the IMS core node; and
cause display of the indication of the health status of the IMS core node.

20. The system of claim 19, wherein the instructions further causes the system to:
parse the health data in accordance with the predefined command to extract data indicative of a health state of the one or more component nodes; and
process the extracted data in accordance with a rule or criterion to produce the indication of the health status in a human-readable format.

* * * * *